United States Patent [19]
Kalogris

[11] 3,987,007
[45] Oct. 19, 1976

[54] ANTIMICROBIAL RESIN COMPOSITIONS CONTAINING ORTHO-BENZYL-PARA-CHLOROPHENOL

[76] Inventor: Theodore P. Kalogris, 4506 Holland Ave., Dallas, Tex. 75219

[22] Filed: Oct. 18, 1974

[21] Appl. No.: 516,087

[52] U.S. Cl. .................................. 260/45.95 H
[51] Int. Cl.² ........................................ C08K 5/13
[58] Field of Search ............... 424/78, 81, 82, 83, 424/347; 260/45.95 H; 106/15 AF

[56] References Cited
UNITED STATES PATENTS

| | | | |
|---|---|---|---|
| 2,925,361 | 2/1960 | Bollenback | 424/347 |
| 3,063,895 | 11/1962 | Pearson | 424/347 |
| 3,197,430 | 7/1965 | Lowes | 424/347 |
| 3,198,764 | 8/1965 | Lowes | 424/81 |
| 3,198,765 | 8/1965 | Lowes | 424/81 |
| 3,284,395 | 11/1966 | Lowes | 424/81 |

Primary Examiner—Paul R. Michl
Attorney, Agent, or Firm—Burton Scheiner

[57] ABSTRACT

Compositions are disclosed which comprise resin, generally synthetic resin and a biologically effective amount of ortho-benzyl-para-chlorophenol. Preferred compositions include a phthalic acid derivative plasticizer-solvent to facilitate distribution of the ortho-benzyl-para-chlorophenol throughout the resinous body of articles formed of the composition.

9 Claims, No Drawings

ANTIMICROBIAL RESIN COMPOSITIONS CONTAINING ORTHO-BENZYL-PARA-CHLOROPHENOL

BACKGROUND OF THE INVENTION

The invention relates to antimicrobial-containing resin compositions, and more particularly synthetic resin compositions incorporating an aromatic derivative of a mono-halogenated phenolic antimicrobial compound, which subsequent to processing, exhibits a level of long-term persistent antimicrobial activity.

In recent years considerable effort has been expended in attempting to develop biostatic-biocidal synthetic resin compositions wherein the antimicrobial activity of the composition is not significantly effected by temperatures and pressures normally encountered in the processing of the compositions into a myriad of final products.

As those well versed in the art of antimicrobial compounds are aware, it is well recognized that the biostatic-biocidal activity of closely related compounds generally varies considerably. The variance in activity is generally not only unpredictable with respect to the compounds per se, but is greatly magnified when such compounds are incorporated in synthetic resin compositions that require the addition of plasticizers, stabilizers, lubricants and pigments in order to render the resin suitable for processing into final products.

Accordingly, the fact that a given compound has per se recognized antimicrobial activity does not in fact assure that such compound will have the same degree of, or any, antimicrobacterial activity when incorporated in other than an inert solvent-carrier. The class of biostats-biocides comprising halogenated phenols is a prime example. While the greater germicidal activity of monohalogen substituted alkyl derivatives of phenol over phenol was recognized in the early 1900's it was almost thirty years before some potent germicidal compounds were discovered among the aromatic derivatives of p-chlorophenol. Among these compounds was the benzyl derivative which was tested against test organisms of the typhoid-colon group. The results proved promising and eventually led to the commercial development of o-benzyl-p-chlorophenol, a potent broad spectrum antimicrobial which in non-aqueous solution has for many years been utilized for the sanitizing of hard surfaces, laundering fabrics, and with dispersing agents, compounded into aqueous detergent compositions having high phenol coefficients.

Therefore, a substantial amount of experimentation is more often than not involved in the development of biostatic-biocidal resin compositions that after processing into a final product retain an effective level of antimicrobial activity over a period of time whereby such products retain such activity during substantially the useful life of the product. It will thus be appreciated that the mere fact that a compound, per se, or in certain solvents or compositions, has antimicrobial properties does not render such compound as an obvious antimicrobial additive for incorporation in synthetic resin compositions, particularly such compositions that must be subjected to relatively high processing temperatures and pressures in order to produce a final consumer product.

Prior art attempts to provide antimicrobial synthetic resinous compositions, as distinguished from merely precluding microbial degradation of polymeric compositions, have often utilized organo-metallic compounds, particularly those based on mercury, tin, arsenic, copper as the active antimicrobial compound. Other classes of antimicrobial compounds include brominated salicylanilides, mercaptans, quaternary ammonium compounds and carbamates, for example. Generally, the above mentioned compounds are characterized by serious drawbacks in that they are highly specific in their antimicrobial activity, highly toxic, thermally degredated, etc., whereby commercial utilization of such compounds is not practical or advisable.

While it is appreciated that many polymers inherently resist biological attack these polymers are seldom used without modification. Other materials such as plasticizers, stabilizers, lubricants, and fillers, necessary to providing resinous compositions that can be molded and extruded on a commercial scale, increases the polymer's vulnerability to fungi and bacteria since they act as a source of food for microorganisms.

Not the least of the problems associated with the molding and extruding of an antimicrobial thermoplastic composition is the provision of a composition capable of withstanding molding and extruding temperatures in the order of 400° to 500° F. Temperatures of this order are necessary for the dispersion of the antimicrobial compound in a thermoplastic synthetic resin, pelletizing of the antimicrobial resinous composition to facilitate handling for subsequent fusion of the pelletized resinous composition to mold or extrude articles and/or film from high molecular weight high density polyethylene, polystyrene, polypropylene, and film grade polyvinylchloride without significant degradation of the active antimicrobial compound incorporated therein.

SUMMARY OF THE INVENTION

The present invention contemplates the provision of broad spectrum molding and extruding temperature thermally stable antimicrobial synthetic resinous compositions and articles having dispersed therein a biologically active amount of ortho-benzyl-para-chlorophenol ($C_{13}H_{11}OCl$) having the structural formula:

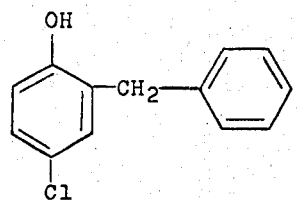

Compounding of antimicrobial synthetic resinous compositions in accordance with the present invention is generally by post polymerization addition of the crystalline ortho-benzyl-para-chlorophenol to a high molecular weight generally rigid polymer. Alternatively dispersion of the antimicrobial compound may be effected by blending with the polymer which is heated to at least above a second transition temperature. Still further, the antimicrobial compound may be dispersed in the finished polymer as a solution of the ortho-benzyl-para-chlorophenol in an organic solvent, such as dioctylphthalate. The invention also contemplated the dispersion of crystalline ortho-benzyl-para-chlorophenol in a particulate diluent vehicle, such as a micropulverized anhydrous sodium potassium aluminum silicate prior to dispersion in a fused or particulate resin.

It has been found that the invention is particularly well suited for imparting antimicrobial properties to high molecular weight polyethylene, of both low and high density, regular grade polystyrene, high impact polystyrene, polypropylene, high temperature polypropylene, and film grade polyvinylchloride, for example. The ortho-benzyl-para-chlorophenol has been generally found to impart significant persistant antibacterial, antifungal and antiprotozal activity to articles and films molded and extruded from synthetic resinous compositions containing in the finished products a minimum of about 0.25% to 0.50% by weight of the active antimicrobial compounds. It will be appreciated that the ortho-benzyl-para-chlorophenol may be incorporated in the resin at a use concentration of about 0.25% to about 0.50% by weight whereby the antimicrobial resinous composition, which may include the usual fillers, plasticizers, etc., may be in appropriate particulate or pelletized form fed directly to conventional molding and extruding apparatus. As a practical matter, it has been found advisable to incorporate the antimicrobial ortho-benzyl-para-chlorophenol in resin at a concentration generally in excess of the use concentration so that antimicrobial compound loaded pellets, granules, etc., may be physically admixed with non-antimicrobial containing resin to arrive at a finished molded or extruded product having the required use concentration of ortho-benzyl-para-chlorophenol in resin intended for subsequent admixture with other compatible resin prior to molding or extruding is in the order of about 10% by weight. While the incorporation of more than 10% might be advantageous, it has been found that problems of recrystallization of the ortho-benzyl-para-chlorophenol are sometimes encountered. However, it will be appreciated that the incorporation of greater percentages of the antimicrobial composition is contemplated by the present invention, albeit necessary to utilize a solvent or diluent system, other than that specifically set forth herein, to preclude recrystallization of the ortho-benzyl-para-chlorophenol in the antimicrobial resinous composition or finished molded or extruded product.

Antimicrobial resinous compositions formulated in accordance with the present invention have been prepared wherein the concentration of ortho-benzyl-para-chlorophenol is in the order of 0.25% to 10.0% by weight of the resin and any resin processing adjuncts admixed therewith. It will be appreciated however that these concentrations of ortho-benzyl-para-chlorophenol are preferred and the invention broadly contemplates the incorporation of any concentration of the compound that will provide an effective level of the antimicrobial compound ortho-benzyl-para-chlorophenol in a molded or extruded resinous product.

The following are examples of preferred modes of carrying forth the present invention with a plurality of polymers. The term polymer as used herein is intended to include generally solid synthetic monopolymers, copolymers, etc., which do not effect any significant re-arrangement of the ortho-benzyl-para-chlorophenol to a related but less effective compound, even though in a technical sense such degredation product exhibits antimicrobial activity.

EXAMPLE I

High Molecular Weight Low Density Polyethylene 0.25%, by weight, of crystalline ortho-benzyl-para-chlorophenol was physically blended with the resin in particulate form and fed into an extruder barrel maintained at a feedstock end temperature of 250° to 260° F and extruded and cut to form molding pellets. The ortho-benzyl-para-chlorophenol-polyethylene pellets were then molded into pill cups, as utilized in hospitals, in conventional injection molding apparatus operating at a temperature of 280° F to 320° F.

Representative segments of the exterior and interior sides of the molded cups were then subjected to bacteriological testing as follows:

PROCEDURE

Test Sample:

The sample was tested using the exterior and interior sides randomly vs. each organism.

Test Media

A.A.T.C.C. Bacteriostasis Agar
Test Organisms:
Staphylococcus aureus 6538
Escherichia coli 4352
Streptococcus faecilis 14506
Incubation:
24 hours at 37° C

| RESULTS: | Zone of Inhibition in mm. | | | |
|---|---|---|---|---|
| Organism | 1 | 2 | 3 | Avg. |
| S. aureus | 3.0 | 3.0 | 3.0 | 3.0 |
| E. coli | 6.0 | 5.0 | 5.0 | 5.3 |
| S. faecalis | 3.0 | 3.0 | 3.0 | 3.0 |

CONCLUSION: The data obtained indicates that the submitted sample exhibits bacteriostatic properties against S. aureus, E. coli, and S. faecalis when tested as specified.

EXAMPLE II

Example I was repeated with the exception that 10.0% by weight, of ortho-benzyl-para-chlorophenol was incorporated and the pellets so obtained admixed with high molecular weight low density polyethylene pellets containing no ortho-benzyl-para-chlorophenol to arrive at a blend concentration of 0.50% by weight, of the antimicrobial compound in finished articles molded from the composition. The results of bacteriological tests were substantially the same as with respect to Example I.

EXAMPLE III

High Molecular Weight High Density Polyethylene 0.25%, by weight, of crystalline ortho-benzyl-para-chlorophenol was physically blended with particulate film grade high molecular weight high density polyethylene and fed into an extruder barrel maintained at a feedstock end temperature of 280° to 320° F and extruded and cut to form pellets. The pellets were fed to an extruder apparatus operating at 480° F and extruded into tubular stock which was slit to form sheet material. In separate runs material of 1, 5 and 7 mils was extruded. Representative portions of the film were subjected to bacteriological testing and found to exhibit antimicrobial activity comparable to the samples of Example I.

In addition, human patch tests and animal oral toxicity tests were conducted as follows:

PROCEDURES:

A. Human Patch Test

Ten (10) test subjects, five (5) male and five (5) female were selected at random. A skin area on the inner surface of the right forearm of each subject was designated for the position of the patch. The sample of 3 cm² was placed in direct contact with the skin at the designated site of application. The patch was then covered with a Pressoplast "Schwartz" patch having a 1½ inch × 1½ inch cellophane center to retard evaporation of any volatile constituents of the test sample. The patch remained in contact with the skin for a period of twenty-four (24) hours. Upon removal of the patch the resulting reaction was evaluated. Readings were also made after 72 hours and the results were incorporated into the final evaluation.

After a five (5) day rest period the ten (10) subjects utilized in the first phase of the test program were again exposed to the sample for twenty-four (24) hours. The procedure followed the pattern as described in the first phase of the test. A positive reaction in the second phase and a negative reaction in the first indicates the presence of sensitizing agents producing an allergic reaction.

B. Acute Oral Toxicity

An aqueous extract of the submitted sample was prepared by placing 100 gms of sample in 200 mls of distilled water with a pH of 7.0. The closed glass container was then placed in an oven maintained at 65° C for seven (7) days. d)

Ten (10) Sherman Strain albino rats (5 male and 5 female) each weighing between 200 gms and 250 gms were selected for the test. Prior to the administration of the extract, the food was withheld from the rats for 24 hours. The animals were then weighed and grouped according to the dosage to be administered.

The extract was then fed to the rats by direct stomach intubation using a syringe with a "ball-point" needle. The animals were retained in their individual wire mesh cages in the conditioned animal room for observations of overt toxic manifestations for a period of fourteen (14) days.

Results:

| | | A. Human Patch Test | | |
|---|---|---|---|---|
| | | Primary | | |
| Subject | Sex | Reaction 24 hrs. | Reaction 72 hrs. | Combined Averge |
| 1 | M | 0 | 0 | 0 |
| 2 | M | 0 | 0 | 0 |
| 3 | M | 0 | 0 | 0 |
| 4 | M | 0 | 0 | 0 |
| 5 | M | 0 | 0 | 0 |
| 6 | F | 0 | 0 | 0 |
| 7 | F | 0 | 0 | 0 |
| 8 | F | 0 | 0 | 0 |
| 9 | F | 0 | 0 | 0 |
| 10 | F | 0 | 0 | 0 |
| | | Secondary | | |
| 1 | M | 0 | 0 | 0 |
| 2 | M | 0 | 0 | 0 |
| 3 | M | 0 | 0 | 0 |
| 4 | M | 0 | 0 | 0 |
| 5 | M | 0 | 0 | 0 |
| 6 | F | 0 | 0 | 0 |
| 7 | F | 0 | 0 | 0 |
| 8 | F | 0 | 0 | 0 |
| 9 | F | 0 | 0 | 0 |
| 10 | F | 0 | 0 | 0 |

B. Acute Oral Toxicity

| Dosage per Kg of Body Weight | Mortality Ratio |
|---|---|
| 25 mils | 0/10 |

Observation:

The animals in acute oral toxicity test showed no overt toxic effect during the observation period.

EXAMPLE IV

Example III was repeated with the exception that the concentration of ortho-benzyl-para-chlorophenol incorporated in the high density polyethylene was increased to 10.0% and the animicrobial containing pellets admixed with high density polyethylene pellets to provide a finished film having 0.50% by weight of ortho-benzyl-para-chlorophenol. The film was subjected to bacterological testing and found to have antimicrobial activity comparable to the composition of Example II.

EXAMPLE V

Example IV was repeated with the exception that about 25% by weight of a micropulverized complex of silicates, namely anhydrous sodium potassium aluminum silicate was admixed with the ortho-benzyl-para-chlorophenol as an inert diluent to assist in uniformly dispersing the antimicrobial compound throughout the resin matrix. The film was subjected to bacteriological testing and found to have antimicrobial activity comparable to the composition of Example IV.

EXAMPLE VI

An intimate admixture of particulate polystyrene with 0.25%, by weight, of ortho-benzyl-para-chlorophenol was introduced into an extruder barrel wherein the feedstock end of the extruder barrel was maintained at a temperature in the range of 365° to 420° F and the antimicrobial polystyrene extruded and chopped into molding pellets. The pellets were then fed to an injection molding apparatus operating at a temperature in the range of 480° F and pill cups molded from the composition. Results of tests for antibacterial activity were comparable to the results set forth with regard to Example I.

EXAMPLE VII

Example VI was repeated with the exception that high impact polystyrene, i.e., which contains butadiene copolymer was substituted for regular grade polystyrene.

EXAMPLE VIII

Example VII was repeated with the exception that 10.0%, by weight, of crystalline ortho-benzyl-para-chlorophenol was dissolved in dioctyl phthalate and the solution of the antimicrobial compound incorporated in the high impact polystyrene heated to a temperature in the order of 375° F.

EXAMPLE X

Polypropylene, of a molecular weight in excess of 40,000 was heated in an extruder barrel maintained at a temperature in the range of 275° to 325° F at the feedstock end and 0.25% by weight, of ortho-benzyl-para-chlorophenol incorporated therein, the extruded antimicrobial composition chopped into pellets. Pill cups were formed from the pellets by injection molding at a temperature in the range of 320° to 480° F. Test results as to the antibacterial activity of the molded product was comparable to the results set forth with regard to Example I.

EXAMPLE XI

Example X was repeated with the exception that 10.0%, by weight, of ortho-benzyl-para-chlorophenol was incorporated and the antimicrobial loaded pellets dilluted with sufficient nonloaded polypropylene pellets to arrive at a concentration of 0.50% antimicrobial compound in the molded articles.

EXAMPLE XII

Particulate film grade polyvinyl chloride was admixed with 0.25%, by weight, of ortho-benzyl-para-chlorophenol in an extruder apparatus wherein the feedstock end of the extruder barrel was maintained at a temperature in the range of 275° to 325° F and pellets formed. The pellets were extruded in conventional apparatus, maintained at the extruder head at about 480° F, to form film ranging in thickness from 0.5 mils to 7.0 mils. Bacteriological tests indicated antimicrobial activity comparable to that set forth with regard to Example I.

EXAMPLE XIII

Pellets produced in accordance with Example II, wherein brown and blue identifying colorant was added, which pellets were molded at different times and stored under normal storage conditions for two and three years respectively were subjected to analysis to determine the antibacterial activity. The tests showed the following:

| Samples Identified as: | (1) "Brown" Pellets |
| --- | --- |
| | (2) "Blue" Pellets |
| Test Performed: | Antibacterial Activity |
| Method Employed: | AATCC Test Method 90–1970 |
| | Antibacterial Activity of Fabrics, |
| | Detection of: Agar Plate Method |
| Test Media: | AATCC Agar and Blood Agar Plates |
| Test Organisms: | *Staphylococcus aureus* |
| | *Pseudomonas aeruginosa* |
| | *Escherichia coli* |
| | *Streptococcus viridans* (alpha hemolytic) |
| Incubation: | 24 hours at 37° C |
| | 16 hours at 4° C, then 8 hours at 37° C |
| | Zone of Inhibition in Millimeters |

-continued

| Organism | Medium | 37° C | | 4° C, then 37° C | |
| --- | --- | --- | --- | --- | --- |
| | | Brown | Blue | Brown | Blue |
| S. aureus | AATCC | 5.0 | 5.0 | 7.0 | 7.0 |
| | BAP | 4.0 | 2.0 | 3.0 | 2.0 |
| Ps. aeruginosa | AATCC | 0.0 | 0.0 | 0.0 | 0.0 |
| | BAP | 7.0 | 3.0 | 2.0 | 0.0 |
| E. coli | AATCC | 1.0 | 0.0 | 1.0 | 0.0 |
| | BAP | 0.0 | 0.0 | 2.0 | 0.0 |
| S. viridans | AATCC | No growth | | No growth | |
| | BAP | 3.0 | 2.0 | 4.0 | 3.0 |

CONCLUSION

The Brown Pellets and the Blue Pellets exhibited antibacterial action against S. aureus, E. coli and S viridans grown on AATCC Agar and exhibited antibacterial action against S. aureus, Ps. aeruginosa, E. coli and S. viridans grown on Blood Agar when tested by the Standard Methods. The differences in the diameters of the zones of inhibition may be interpreted as indicative of the relative susceptibility of the various organisms to the agent contained in the pellets. The presence of a definite zone of inhibition of any size may be regarded as significant.

I claim:

1. In an antimicrobial solid synthetic resinous composition which in the fabrication of articles and films is subjected to relatively high temperature, the improvement consisting essentially of the incorporation of a antimicrobially effective amount of ortho-benzyl-para-chlorophenol.

2. The composition of claim 1 wherein 0.25% to 10.0%, by weight, of ortho-benzyl-para-chlorophenol is present in the resinous composition.

3. The composition of claim 1 including a particulate inert inorganic diluent to assist in dispersing the ortho-benzyl-para-chlorophenol in the resinous composition.

4. The composition of claim 1 wherein the relatively high temperature is in the order of about 275° F to about 480° F.

5. The composition of claim 1 wherein the solid synthetic resinous composition comprises a synthetic resin selected from the group consisting of polyethylene, polystyrene, polystyrene butadiene copolymer, polypropylene and polyvinyl chloride.

6. An antimicrobial composition of matter capable of withstanding molding temperatures in the order of about 275° F to about 500° F without significant loss of antimicrobial activity, the essential constituents of which are (1) a solid synthetic polymer and (2) at least an antimicrobially effective amount of ortho-benzyl-para-chlorophenol.

7. The composition of claim 6 wherein 0.25% to 10.0%, by weight, of ortho-benzyl-para-chlorophenol is present in the composition.

8. A polymeric article of manufacture having antimicrobial properties, subsequent to molding temperatures in the order of about 275° F to about 500° F, comprised of (1) a solid synthetic polymer and (2) at least an antimicrobially effective amount of ortho-benzyl-para-chlorophenol.

9. The article of manufacture of claim 8 wherein 0.25% to 10.0%, by weight, of ortho-benzyl-para-chlorophenol is present in the polymeric article.

* * * * *